United States Patent
Yang et al.

(10) Patent No.: US 10,419,998 B2
(45) Date of Patent: Sep. 17, 2019

(54) TECHNIQUES FOR CONFIGURING AN ADVANCED RECEIVER BASED ON CELL INFORMATION, CHANNEL ALLOCATION INFORMATION, OR A DEVICE DISPLAY STATUS

(71) Applicant: QUALCOMM Incorporated, San Diego, CA (US)

(72) Inventors: Yue Yang, San Diego, CA (US); Srinivasan Balasubramanian, San Diego, CA (US); Aziz Gholmieh, Del Mar, CA (US); Prashant Udupa Sripathi, San Jose, CA (US); Shailesh Maheshwari, San Diego, CA (US); Vishal Dalmiya, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/350,941

(22) Filed: Nov. 14, 2016

(65) Prior Publication Data
US 2018/0139672 A1   May 17, 2018

(51) Int. Cl.
| | |
|---|---|
| *H04W 36/22* | (2009.01) |
| *H04W 36/14* | (2009.01) |
| *H04W 88/02* | (2009.01) |
| *H04W 52/02* | (2009.01) |
| *H04W 84/04* | (2009.01) |

(Continued)

(52) U.S. Cl.
CPC .......... *H04W 36/22* (2013.01); *H04W 36/14* (2013.01); *H04W 52/0229* (2013.01); *H04W 52/0254* (2013.01); *H04W 52/0258* (2013.01); *H04W 88/02* (2013.01); *H04W 52/0238* (2013.01); *H04W 84/042* (2013.01); *H04W 84/12* (2013.01); *H04W 88/06* (2013.01); *H04W 88/08* (2013.01); *Y02D 70/00* (2018.01); *Y02D 70/1242* (2018.01); *Y02D 70/1262* (2018.01); *Y02D 70/142* (2018.01); *Y02D 70/146* (2018.01)

(58) Field of Classification Search
None
See application file for complete search history.

(56) References Cited

U.S. PATENT DOCUMENTS

| | | | |
|---|---|---|---|
| 8,645,732 | B2 | 2/2014 | Naware et al. |
| 9,369,253 | B2 | 6/2016 | Pourahmadi et al. |

(Continued)

FOREIGN PATENT DOCUMENTS

| | | |
|---|---|---|
| EP | 3016447 A1 | 5/2016 |
| WO | 2014189461 A1 | 11/2014 |

OTHER PUBLICATIONS

International Search Report and Written Opinion—PCT/US2017/053975—ISA/EPO—dated Dec. 7, 2017.

*Primary Examiner* — Otis L Thompson, Jr.
(74) *Attorney, Agent, or Firm* — Harrity & Harrity, LLP\Qualcomm

(57) ABSTRACT

A method, an apparatus, and a computer program product for wireless communication are provided. The apparatus may identify a trigger condition relating to one or more of cell information regarding a cell to which the apparatus is connected, channel allocation information regarding the device, or a device display status of the apparatus. The apparatus may selectively activate or deactivate an advanced receiver of the apparatus based at least in part on the trigger condition.

30 Claims, 17 Drawing Sheets

(51) Int. Cl.
*H04W 84/12* (2009.01)
*H04W 88/06* (2009.01)
*H04W 88/08* (2009.01)

(56) References Cited

U.S. PATENT DOCUMENTS

| | | | |
|---|---|---|---|
| 2008/0081647 A1* | 4/2008 | Lee | H04W 52/0229 455/466 |
| 2010/0223522 A1* | 9/2010 | Duggan | H04L 1/0021 714/748 |
| 2010/0232356 A1* | 9/2010 | Maheshwari | H04L 1/1867 370/328 |
| 2011/0064043 A1* | 3/2011 | Balachandran | H04L 5/0037 370/330 |
| 2011/0208984 A1* | 8/2011 | Naware | H04W 52/0229 713/320 |
| 2012/0207070 A1 | 8/2012 | Xu et al. | |
| 2013/0157722 A1* | 6/2013 | Kim | H04M 1/72563 455/566 |
| 2014/0071844 A1 | 3/2014 | Mujtaba et al. | |
| 2014/0153488 A1 | 6/2014 | Koivisto et al. | |
| 2014/0177498 A1* | 6/2014 | Park | H04W 52/0225 370/311 |
| 2014/0213237 A1 | 7/2014 | Yang et al. | |
| 2015/0004956 A1* | 1/2015 | Aksamit | H04W 4/025 455/418 |
| 2015/0181606 A1* | 6/2015 | Gribe | H04W 4/06 370/329 |
| 2015/0257145 A1* | 9/2015 | Teng | H04W 28/18 455/437 |
| 2015/0264620 A1* | 9/2015 | Timus | H04W 36/32 455/440 |
| 2016/0149734 A1* | 5/2016 | Nguyen | H04L 27/0008 375/324 |
| 2016/0198373 A1 | 7/2016 | Thangarasa et al. | |
| 2016/0242229 A1* | 8/2016 | Balachandran | H04W 72/0406 |
| 2016/0337227 A1* | 11/2016 | Palenius | H04W 24/08 |
| 2017/0244434 A1* | 8/2017 | Sesia | H04B 1/1027 |
| 2017/0265061 A1* | 9/2017 | Sherman | H04W 52/0254 |

* cited by examiner

TECHNIQUES FOR CONFIGURING AN ADVANCED RECEIVER BASED ON CELL INFORMATION, CHANNEL ALLOCATION INFORMATION, OR A DEVICE DISPLAY STATUS

BACKGROUND

Field

The present disclosure relates generally to communication systems, and more particularly, to techniques for configuring an advanced receiver based on cell information, channel allocation information, or a device display status.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A user equipment (UE) may include an advanced receiver (ARx) to improve physical layer receiver decoding performance and mitigate interference (e.g., inter-cell interference or intra-cell interference) using receiver diversity features, such as 4-antenna reception (4Rx); interference cancellation features, such as Common Reference Signal Interference Cancellation (CRS-IC); and the like.

The UE may activate or deactivate the advanced receiver based at least in part on a difference in a physical layer (e.g., Layer 1 of the Open System Interconnect (OSI) model) measurement, such as a reference signal received power (RSRP) measurement, between a serving cell of the UE and an interfering cell of the UE. However, when the serving cell is associated with poor quality, the improvement to decoding performance associated with activating the advanced receiver may be limited. Also, it may be of limited benefit to activate the advanced receiver when data being received or transmitted by the UE is not associated with a high priority or importance. The advanced receiver consumes battery power of the UE, and it may be beneficial to selectively deactivate the advanced receiver to conserve battery power when the benefit of activating the advanced receiver is limited.

SUMMARY

Aspects described herein may determine whether to activate or deactivate the advanced receiver using information or measurements other than an RSRP difference between the serving cell and the interfering cell. The information or measurements may include, for example, cell information (e.g., a cell type or high speed condition of the serving cell, historical performance of the cell, information identifying a neighbor or interfering cell, a radio access technology to which the UE is connected, etc.), bandwidth allocation information (e.g., an estimated bandwidth allocation based at least in part on a noise estimation or scheduling information, a traffic arrival prediction, etc.), a device display status, and/or information determined using the above information or measurements (e.g., for the UE and/or other UEs or cells). Thus, battery power of the UE is conserved when the advanced receiver is deactivated, and reception performance of the UE is preserved or improved by activating the advanced receiver in situations when the UE may benefit from activation of advanced receiver.

In an aspect of the disclosure, a method, a device, an apparatus, and a computer program product are provided.

In some aspects, the method may include identifying, by a UE, a trigger condition relating to one or more of: cell information regarding a cell to which the UE is connected; channel allocation information regarding the UE; or a device display status of the UE. The method may include selectively activating or deactivating, by the UE, an advanced receiver of the UE based at least in part on the trigger condition.

In some aspects, the device may include memory and one or more processors coupled to the memory. The memory and the one or more processors may be configured to identify a trigger condition relating to one or more of: cell information regarding a cell to which the device is connected, channel allocation information regarding the device, or a device display status of the device. The memory and the one or more processors may be configured to selectively activate or deactivate an advanced receiver of the device based at least in part on the trigger condition.

In some aspects, the apparatus may include means for identifying a trigger condition relating to one or more of: cell information regarding a cell to which the apparatus is connected; channel allocation information regarding the apparatus; or a device display status of the apparatus. The apparatus may include means for selectively activating or deactivating, by the apparatus, an advanced receiver of the apparatus based at least in part on the trigger condition.

In some aspects, the computer program product may include a non-transitory computer-readable medium storing one or more instructions for wireless communication that, when executed by one or more processors of a device, cause the one or more processors to identify a trigger condition relating to one or more of: cell information regarding a cell to which the UE is connected; channel allocation information regarding the UE; or a device display status of the UE. The one or more instructions may cause the one or more processors to selectively activate or deactivate an advanced receiver of the UE based at least in part on the trigger condition.

DETAILED DESCRIPTION

Figure 1:
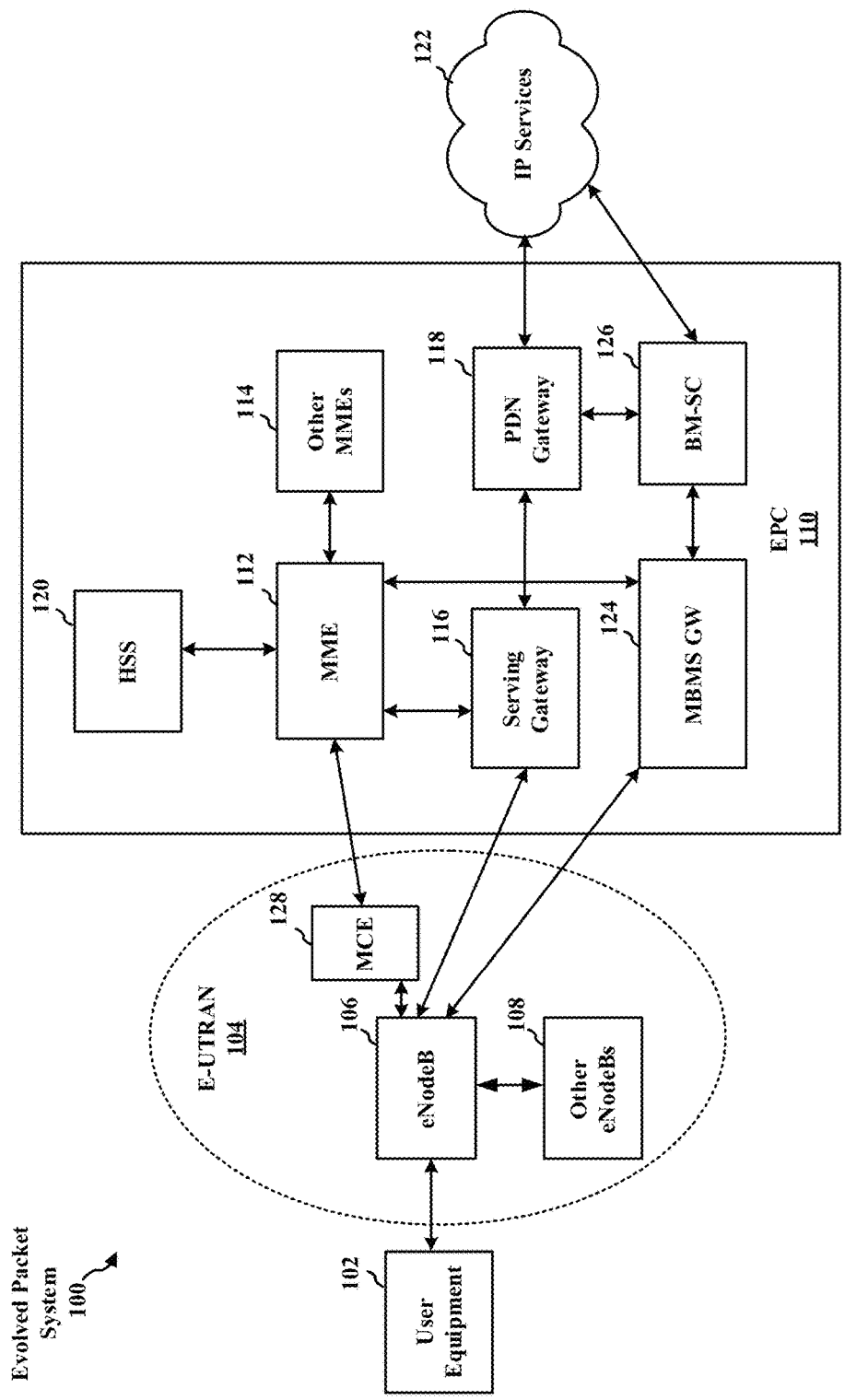
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 102, as described herein, may selectively activate or deactivate an advanced receiver based at least in part on cell information, channel allocation information, and/or a device display status.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
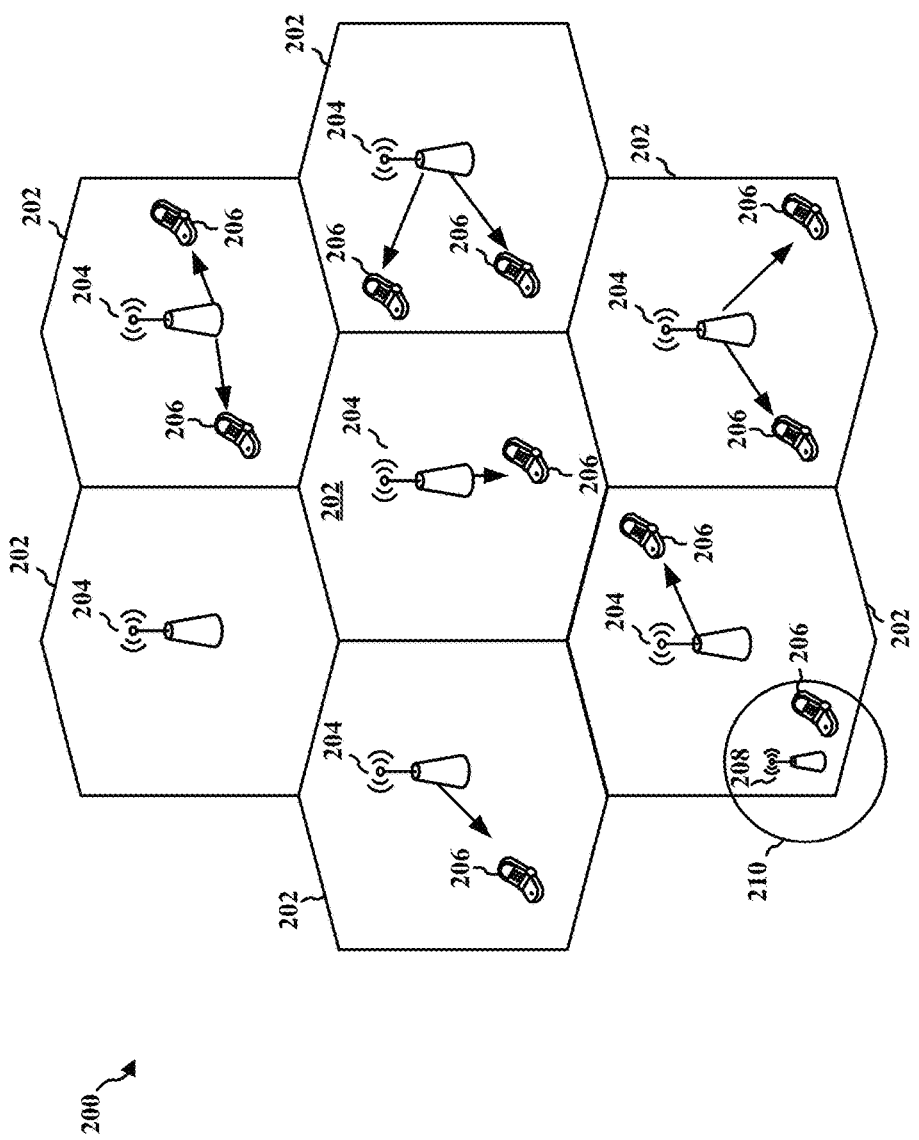
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. In such a case, a UE 102, 206 may use an advanced receiver to improve downlink performance by mitigating interference associated with the overlap. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity. Furthermore, the UE(s) 206 may selectively perform various advanced receiver operations to improve downlink performance when channel conditions are unfavorable, as described in more detail elsewhere herein.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
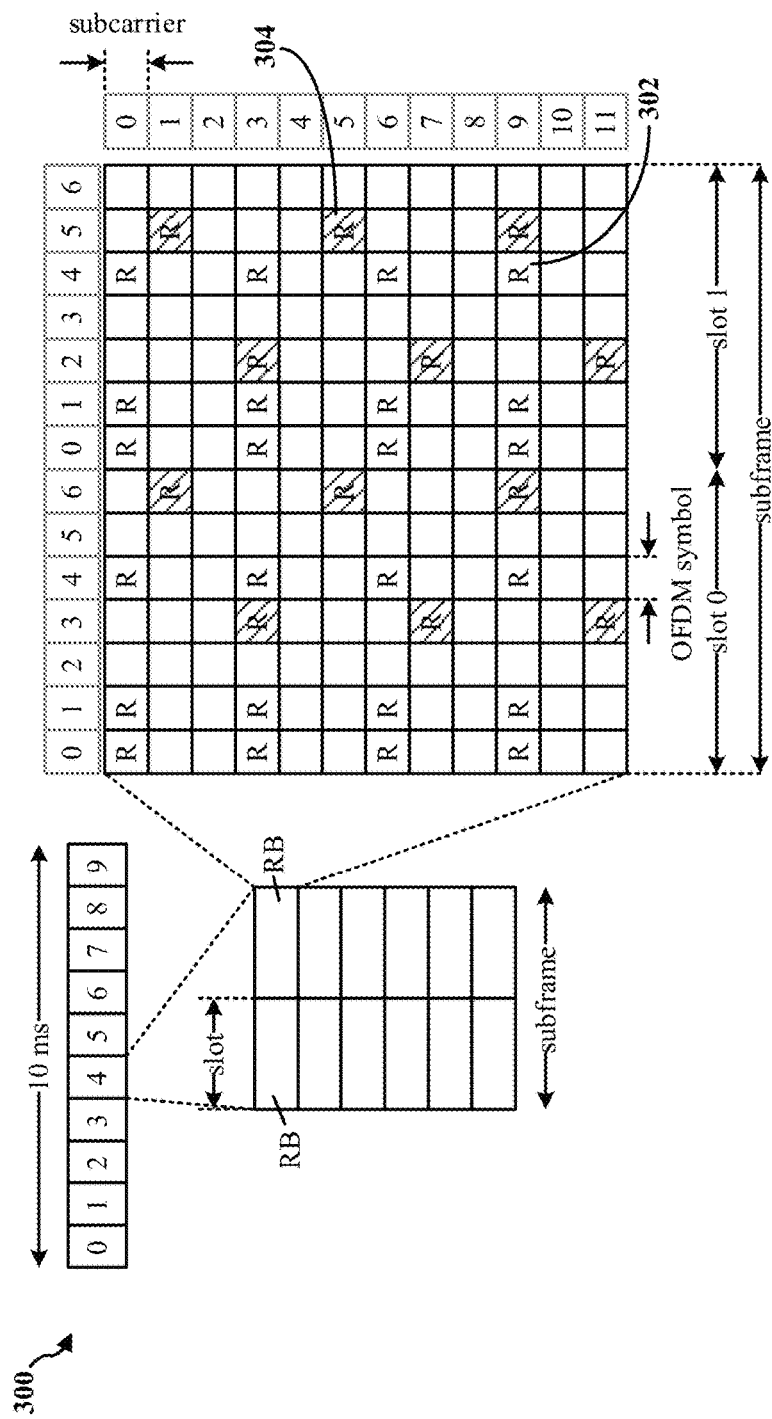
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

As indicated above, FIG. 3 is provided as an example. Other examples are possible and may differ from what was described above in connection with FIG. 3.

Figure 4:
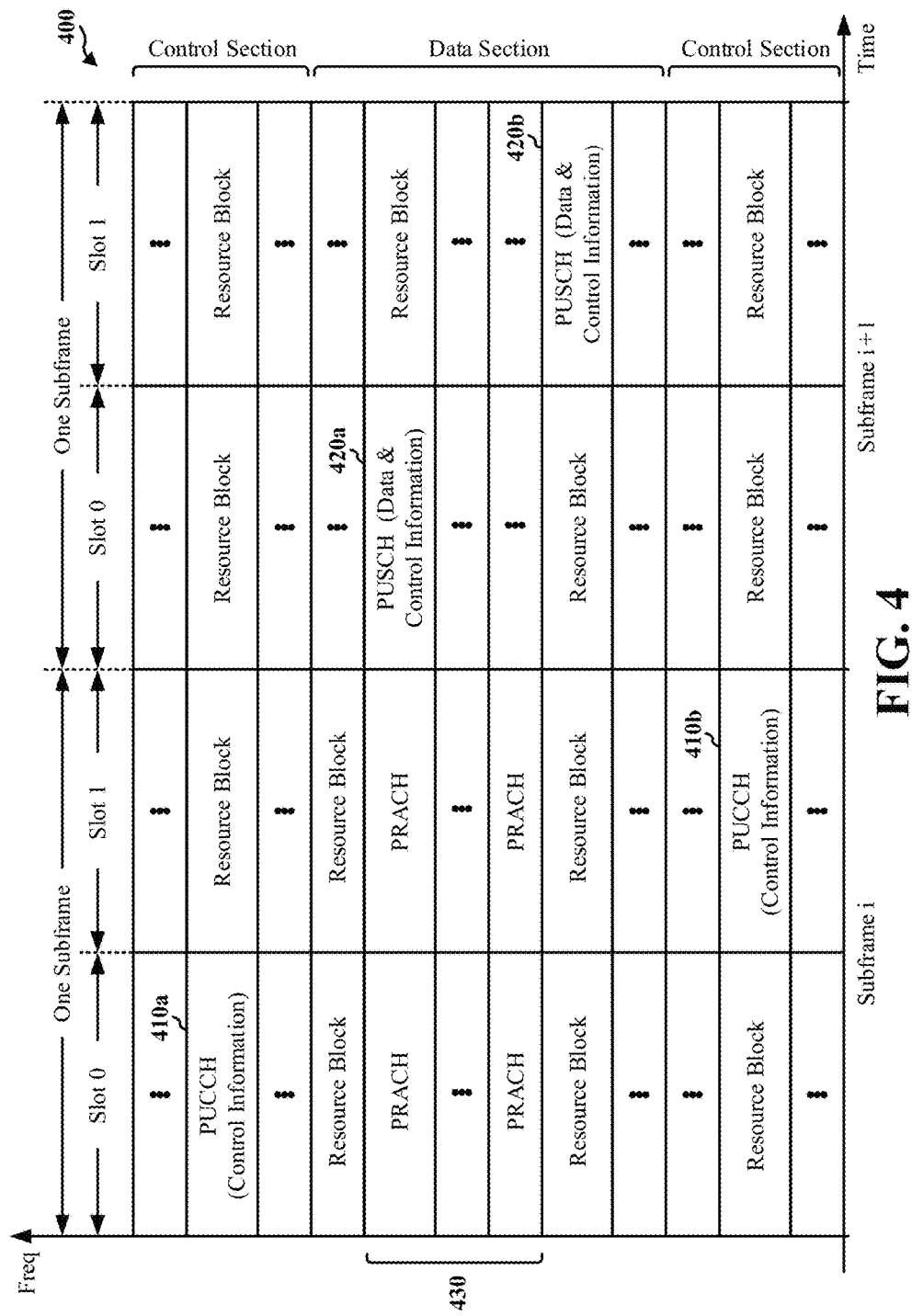
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information (e.g., information associated with scheduling and/or configuring downlink communications with the UE based at least in part on a link adaptation process, such as outer link loop adaptation, or other information) in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

As indicated above, FIG. 4 is provided as an example. Other examples are possible and may differ from what was described above in connection with FIG. 4.

Figure 5:
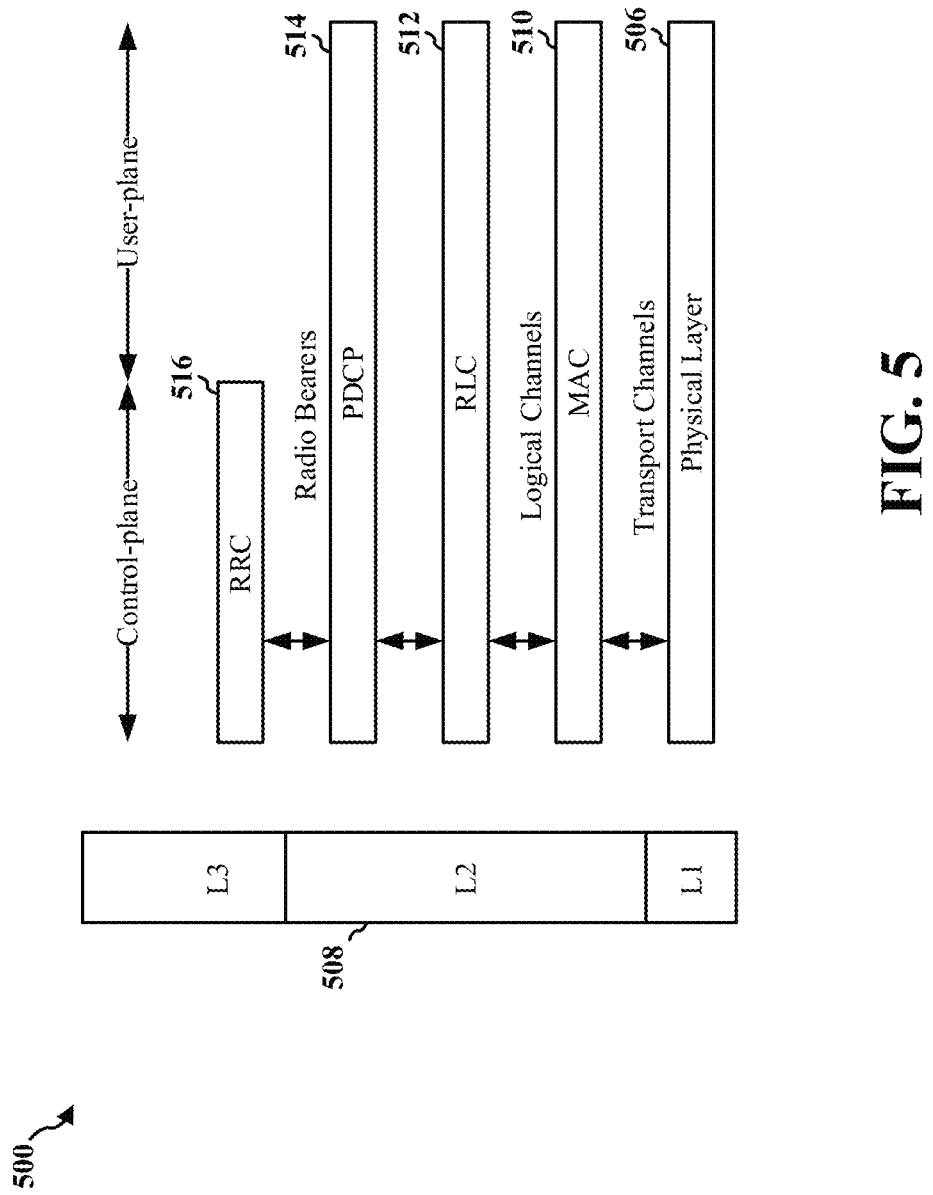
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
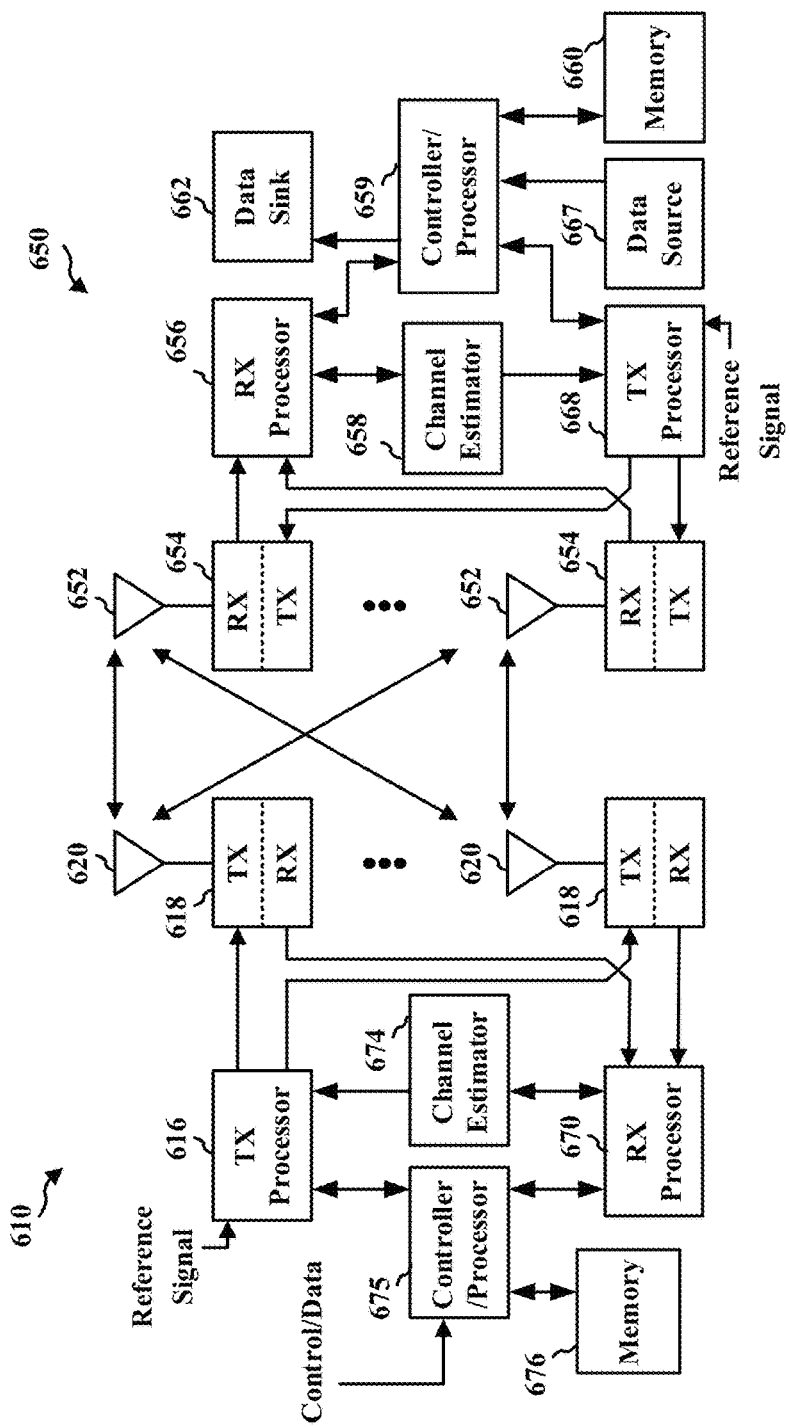
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. In some aspects, the channel estimates may be used to determine channel allocation information, and the UE 650 may selectively activate or deactivate an advanced receiver based at least in part on the channel allocation information. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions and/or advanced receiver functions (e.g., multi-antenna reception) of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. In some aspects, the controller/processor 659 may implement various advanced receiver functions, such as interference cancellation. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7A:
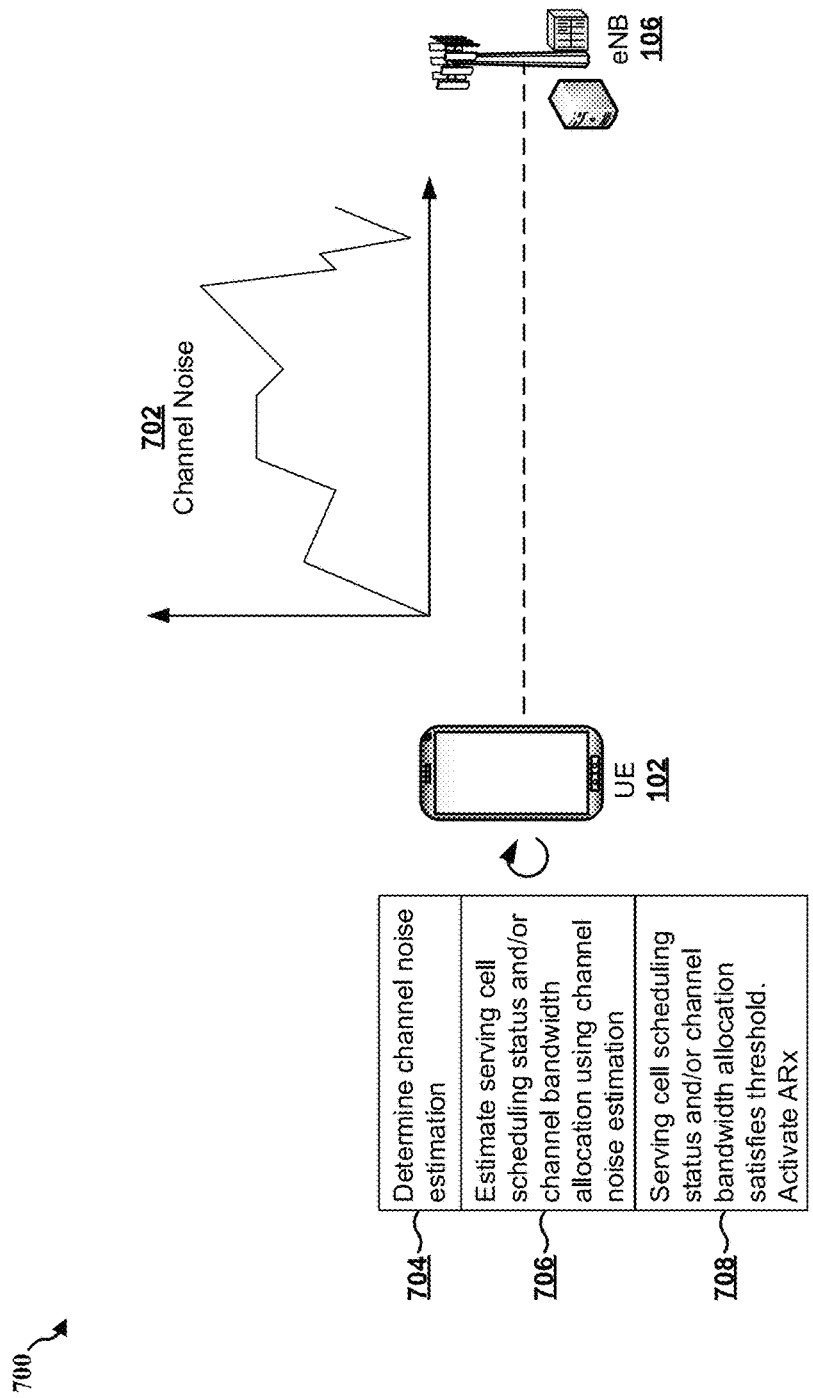
FIGS. 7A-7F are diagrams illustrating an example system configured to selectively activate or deactivate an advanced receiver based at least in part on cell information, channel allocation information, and/or a device display status.

FIGS. 7A-7F are diagrams illustrating an example system configured to selectively activate or deactivate an advanced receiver based at least in part on cell information, channel allocation information, and/or a device display status. As shown in FIG. 7A, example system 700 may include a UE 102 (e.g., which may correspond to one or more of the UE 102 of FIG. 1, the UE 206 of FIG. 2, the UE 650 of FIG. 6, and/or the like), and an eNB 106 (e.g., which may correspond to one or more of the eNBs 106, 108 of FIG. 1, the eNBs 204, 208 of FIG. 2, the eNB 610 of FIG. 6, and/or the like).

As shown in FIG. 7A, and by reference number 702, a connection between a UE 102 and an eNB 106 may be associated with channel noise. Channel noise may occur when a channel provided by the eNB 106 is associated with multiple, different connections with various UEs 102. The quantity and distribution of channel noise in a channel may permit estimation of characteristics of the channel bandwidth allocation. For example, channels or sub-channels that are heavily utilized or heavily scheduled may have more channel noise than channels or sub-channels that are lightly utilized or lightly scheduled.

As shown by reference number 704, the UE 102 may determine a channel noise estimation with regard to the connection with the eNB 106. The UE 102 may determine the channel noise estimation by scanning frequencies of the channel to identify relative noise levels of the frequencies, and performing a noise estimation algorithm using the relative noise levels of the frequencies.

As shown by reference number 706, the UE 102 may estimate a serving cell scheduling status and/or a channel bandwidth allocation using the channel noise estimation information. For example, the UE 102 may use a process, such as least-squares channel estimation, iterative channel estimation, and/or the like, based at least in part on the channel noise estimation information, to identify the serving cell scheduling status and/or the channel bandwidth allocation.

As shown by reference number 708, the UE 102 may determine that the serving cell scheduling status and/or the channel bandwidth allocation satisfies a threshold, and may activate an advanced receiver of the UE 102 based at least in part on the serving cell scheduling status and/or the channel bandwidth allocation satisfying the threshold. For example, the threshold may identify a threshold quantity or ratio of allocated bandwidth. When the channel bandwidth allocation satisfies the threshold, the UE may activate the advanced receiver. For example, the advanced receiver may provide more efficient interference cancellation in a channel when the channel is heavily utilized or scheduled than when the channel is lightly utilized or scheduled. By activating the advanced receiver when the serving cell scheduling status and/or the channel bandwidth allocation satisfies the threshold, the UE 102 implements interference cancellation when the UE 102 is likely to benefit most from the interference cancellation.

When the serving cell scheduling status and/or the channel bandwidth do not satisfy the threshold (e.g., when the channel is lightly utilized or scheduled), the UE 102 may not activate the advanced receiver or may deactivate the advanced receiver (e.g., when the advanced receiver is already active). By deactivating the advanced receiver when the advanced receiver is unlikely to improve reception performance, the UE 102 conserves battery power and processor resources. In some aspects, the UE 102 may use a link adaptation process, such as an outer link loop adaptation (OLLA) process, to signal to the eNB 106 to adjust an MCS or resource block (RB) allocation of the UE 102. The link adaptation process may use feedback regarding downlink performance of the connection between the UE 102 and the eNB 106 to report downlink performance to the eNB 106, and the eNB may adjust scheduling (e.g., an MCS or RB allocation) of the UE 102 based at least in part on the downlink performance. Thus, the UE 102 improves downlink reception of the UE 102 without activating the advanced receiver.

Figure 7B:
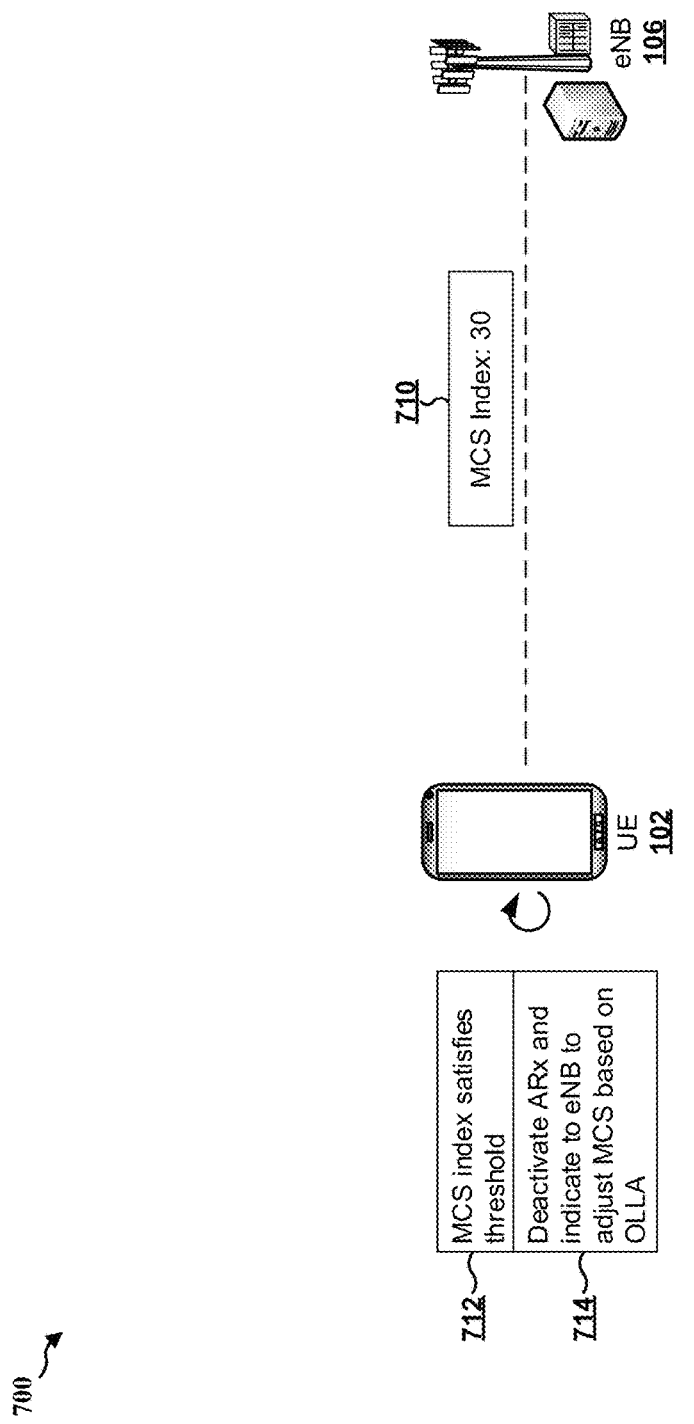

As shown in FIG. 7B, and by reference number 710, the connection between the UE 102 and the eNB 106 may be associated with a particular MCS index (e.g., an MCS index of 30). A relatively high MCS index, corresponding to a complex encoding scheme and/or a high throughput of the connection, may provide poor downlink performance when channel quality is low or channel noise is high. A relatively low MCS index, corresponding to a simple encoding scheme and/or a low throughput of the connection, may provide better downlink performance than the relatively high MCS index in such conditions. The advanced receiver of the UE 102 may provide more benefit in the case of a relatively low MCS index than in the case of a relatively high MCS index. For example, the advanced receiver may perform more effectively for low MCS index values than for high MCS index values.

As shown by reference number 712, the UE 102 may determine that the MCS index satisfies a threshold. The threshold may identify an MCS index value, a modulation and coding scheme, and/or a data rate for which to activate or deactivate the advanced receiver. A value of the threshold may be selected based at least in part on a predicted improvement associated with activating or deactivating the advanced receiver (e.g., a predicted improvement in reception performance or battery and/or processor usage).

As shown by reference number 714, the UE 102 may deactivate the advanced receiver based at least in part on the MCS index satisfying the threshold (e.g., when the advanced receiver may provide inadequate improvement of downlink performance due to the complex encoding scheme and/or high throughput). By deactivating the advanced receiver when the MCS index satisfies the threshold, the UE 102 conserves battery power and processor resources that would otherwise be used to implement the advanced receiver for limited benefit. As further shown, the UE 102 may indicate, to the eNB 106, to decrease the MCS index for the UE 102 based at least in part on link adaptation (e.g., the OLLA process), which may improve downlink performance of the UE when channel quality is low. In this way, the UE 102 improves downlink performance without activating the advanced receiver, which conserves battery power and processor resources of the UE 102.

Figure 7C:
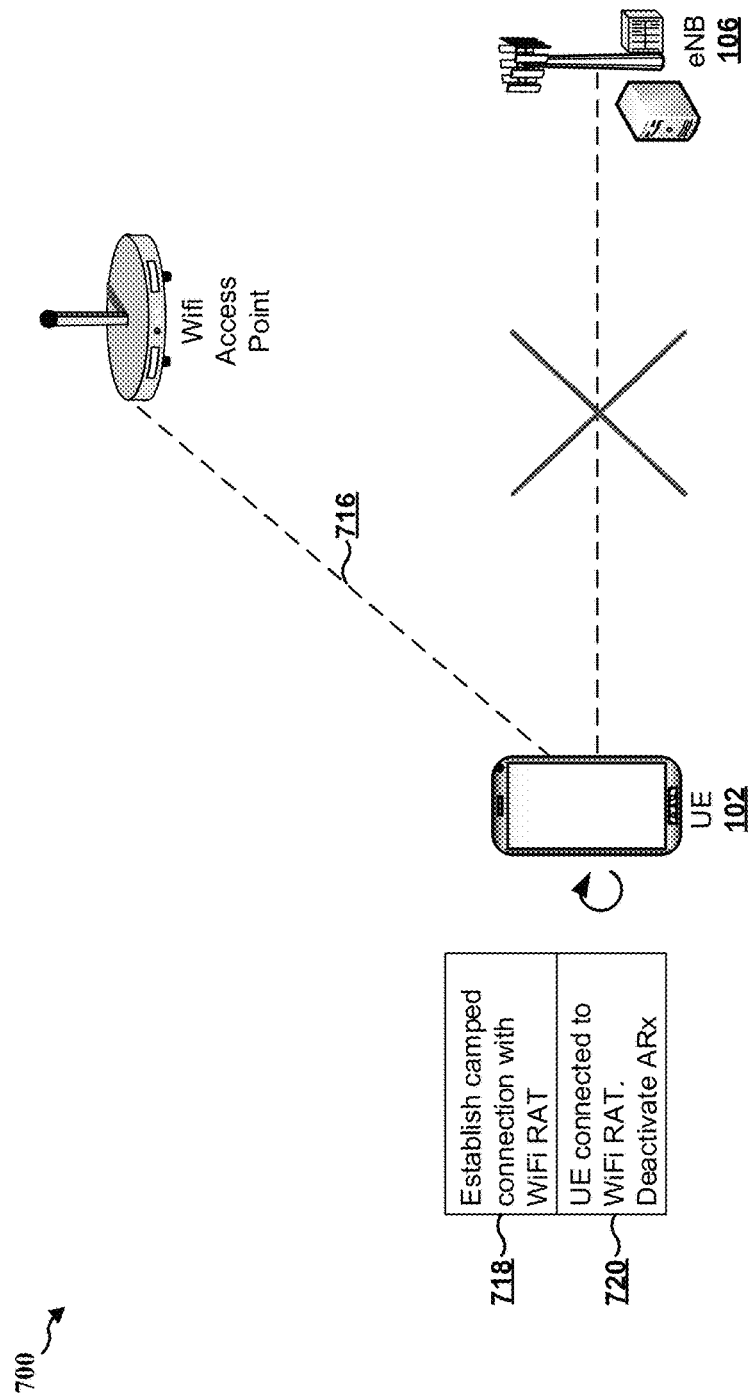

As shown in FIG. 7C, and by reference number 716, in some aspects, the UE 102 may establish a connection with a WiFi access point (e.g., using a WiFi radio access technology (RAT)). For example, as shown by reference number the 718, the UE 102 may be camped on the WiFi access point as a serving cell of the UE 102 (e.g., in the voice domain or the data domain). As further shown, in such a case, the UE 102 may not be connected with the eNB 106. For example, the UE 102 may be isolated from the eNB 106, may not be configured for cellular data, or the like. In such a case, the advanced receiver may provide little or no improvement for downlink performance of the UE 102. For example, the advanced receiver may be configured to improve cellular reception performance and not WiFi signal reception performance. Therefore, the drawbacks to activating the advanced receiver (e.g., processor and/or battery consumption) when the UE 102 is camped on the WiFi RAT may outweigh the improvements to downlink performance of the UE 102.

As shown by reference number 720, the UE 102 may deactivate the advanced receiver based at least in part on establishing the connection with the WiFi RAT. By deactivating the advanced receiver, the UE 102 conserves battery and/or processor resources that would otherwise be used to implement the advanced receiver when the advanced receiver may provide little or no benefit.

Figure 7D:
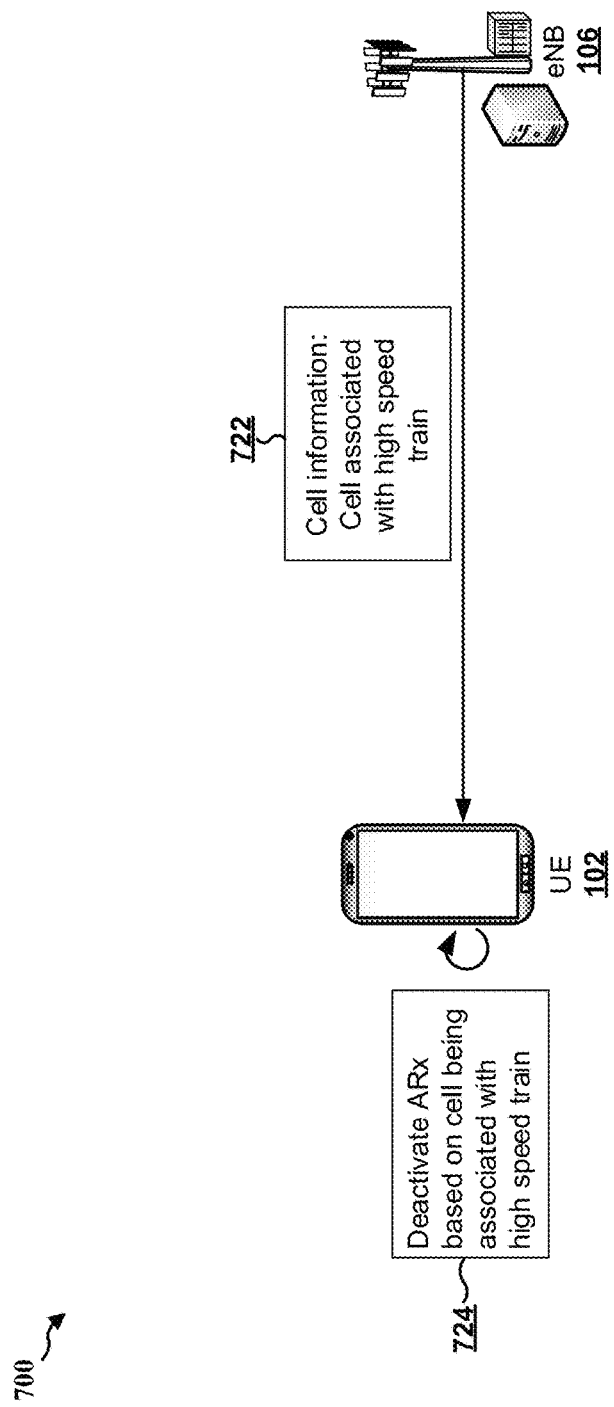

As shown in FIG. 7D, and by reference number 722, in some aspects, the UE 102 may receive cell information relating to a cell to which the UE 102 is connected (e.g., a cell provided by eNB 106). Here, the cell information indicates that the cell is associated with a high speed train. In some aspects, the UE 102 may determine that the cell is associated with a high speed train (e.g., based at least in part on a location and/or a movement speed of the UE 102). Additionally, or alternatively, the eNB 106 or another UE 102 may provide, to the UE 102, information indicating that the cell is associated with a high speed train (e.g., signaling that includes a high speed train flag). In some aspects, more generally, the UE 102 may identify a high speed condition associated with a cell. For example, the UE 102 may determine that the UE 102 is associated with a threshold speed in a particular cell, may determine that other UEs 102 are associated with the threshold speed in the particular cell, may receive information from the eNB 106 indicating that the cell is associated with the high speed condition, or the like.

As shown by reference number 724, the UE 102 may deactivate the advanced receiver in the cell associated with the high speed train. For example, when the cell is associated with a high speed train, UEs 102 moving through the cell may be moving at high speed. Therefore, the interference cancellation operations performed by advanced receivers of the UEs 102 may be less effective than in a cell in which UEs 102 travel at a slower speed (e.g., walking speed, driving speed, etc.). For example, the interference cancellation operations may reduce interference based at least in part on detection of patterns of interference, and the high speed movement of the UEs 102 may hamper detection of the patterns of interference, or may obfuscate the patterns of interference. By deactivating the advanced receiver in the cell associated with the high speed condition, the UE 102 conserves processor resources and battery power that would otherwise be used to activate the advanced receiver for limited benefit.

Figure 7E:
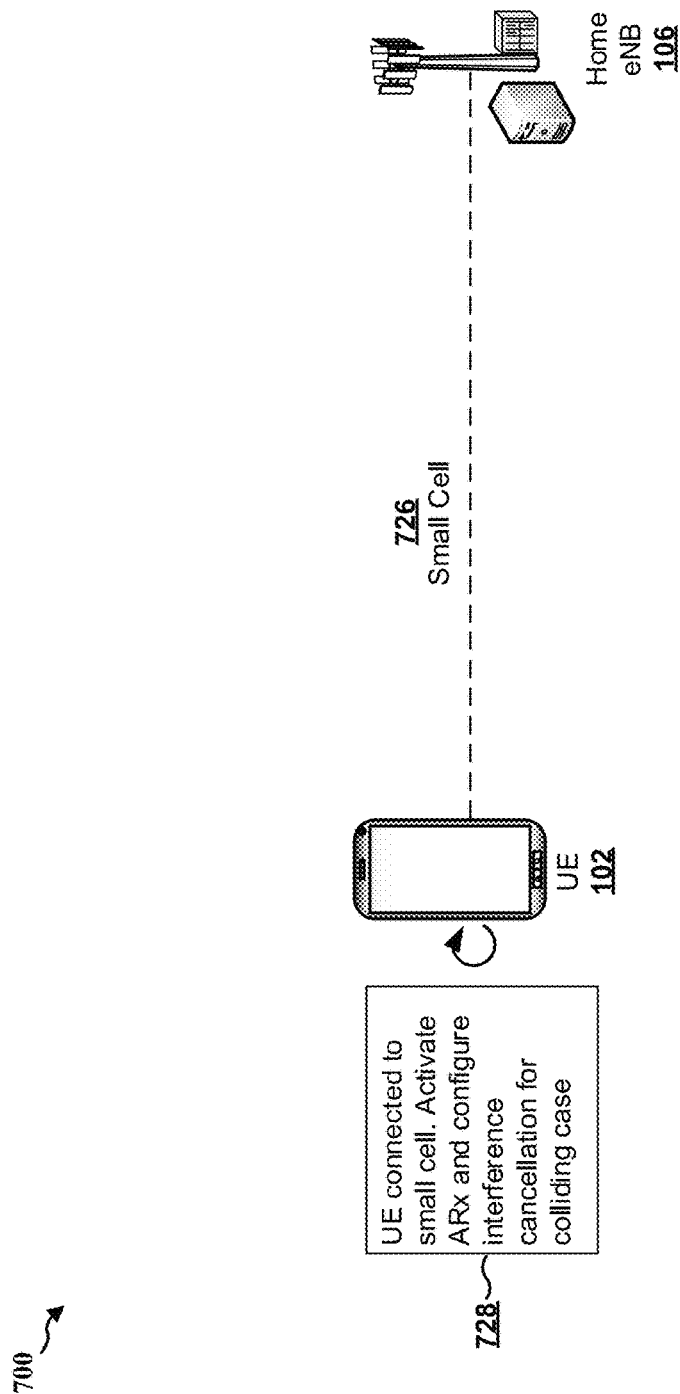

As shown in FIG. 7E, and by reference number 726, in some aspects, the UE 102 may connect with a small cell (e.g., a micro cell, a pico cell, a femto cell, etc.). Here, as shown, the eNB 106 is a home eNB 106 that provides a small cell. In some aspects, a particular configuration of interference cancellation (e.g., common reference signal interference cancellation (CRS-IC) may perform more effectively in a small cell as compared to a large cell (e.g., a macro cell or regular cell). For example, CRS-IC may be performed for a colliding case (e.g., when the common reference signal of the dominant or serving cell and the interfering cell are overlapped) or for a non-colliding case (e.g., when the common reference signal of the dominant or serving cell and the interfering cell do not overlap). The colliding case of CRS-IC may provide better downlink performance for a small cell, and the non-colliding case of CRS-IC may provide better downlink performance for a large cell.

As shown by reference number 728, the UE 102 may determine that the UE 102 is connected to a small cell. As shown, the UE 102 may accordingly activate an advanced receiver of the UE 102, and may configure interference cancellation of the advanced receiver. Here, the UE 102 configures the CRS-IC process for the colliding case based at least in part on the UE 102 being connected to a small cell. In a case where the UE 102 is connected to a macro cell, the UE 102 may selectively activate the advanced receiver (e.g., according to one or more other factors described herein) and may configure the CRS-IC process for the non-colliding case.

Figure 7F:
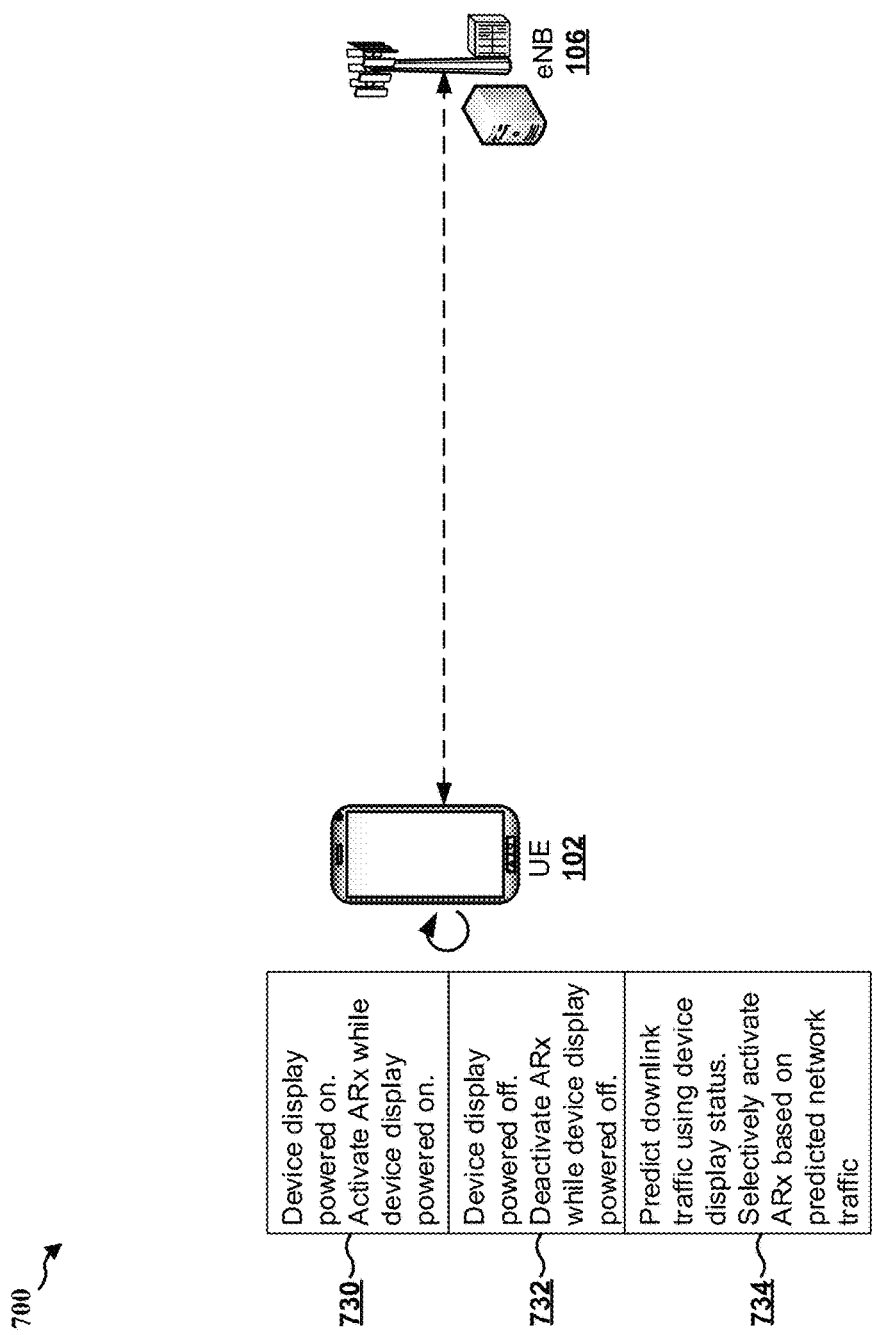

As shown in FIG. 7F, and by reference number 730, in some aspects, the UE 102 may determine that a device display of the UE 102 is powered off. The device display status of the UE 102 may indicate the relative importance or likelihood of occurrence of data en route to or from the UE 102. For example, when the UE device display is powered off, data en route to the UE 102 may be likely to be relatively unimportant (e.g., background data, etc.). Additionally, or alternatively, when the UE device display is powered on, data en route to the UE 102 may be likely to be relatively important. For example, when the UE device display is powered on, the data may have been requested by a user, may be related to web browsing, streaming, or gaming content, and/or the like. As further shown, the UE 102 may activate the advanced receiver when the UE device display is powered on. In this way, the UE 102 improves downlink performance when the data en route to the UE 102 is likely to be important (e.g., when the UE device display is powered on).

As shown by reference number 732, the UE 102 may determine that the UE device display is powered off. Accordingly, the UE 102 may deactivate the advanced receiver. By deactivating the advanced receiver when the UE device display is powered off, the UE 102 conserves processor and battery resources that would otherwise be used to operate the advanced receiver for unimportant and/or sparse data.

As shown by reference number 734, in some aspects, the UE 102 may predict downlink traffic using the device display status. For example, the UE 102 may determine that downlink traffic is likely to arrive a particular length of time after the UE device display is powered on. Additionally, or alternatively, the UE 102 may determine that downlink traffic is unlikely to be received within a particular length of time after the UE device display is powered off. In some aspects, the UE 102 may predict the downlink traffic based at least in part on additional or alternative factors, such as past behavior of a user of the UE 102, a traffic type received or transmitted by the UE 102, motion information associated with the UE 102, a channel quality report received by the UE 102, and/or the like.

As further shown, the UE 102 may selectively activate the advanced receiver based at least in part on the predicted downlink traffic. For example, the UE 102 may activate the advanced receiver in periods when the UE 102 is predicted to receive downlink traffic, and may deactivate the advanced receiver in periods when the UE 102 is predicted not to receive downlink traffic. In this way, the UE 102 conserves battery and processor resources in the periods when the advanced receiver is deactivated, and improves reception of the downlink traffic in the periods when the advanced receiver is activated. In some aspects, the UE 102 may predict the downlink traffic based at least in part on the UE device display status. Additionally, or alternatively, the UE 102 may predict the downlink traffic independently of the UE device display status.

As indicated above, FIGS. 7A-7F are provided as examples. Other examples are possible and may differ from what was described with regard to FIGS. 7A-7F.

Figure 8A:
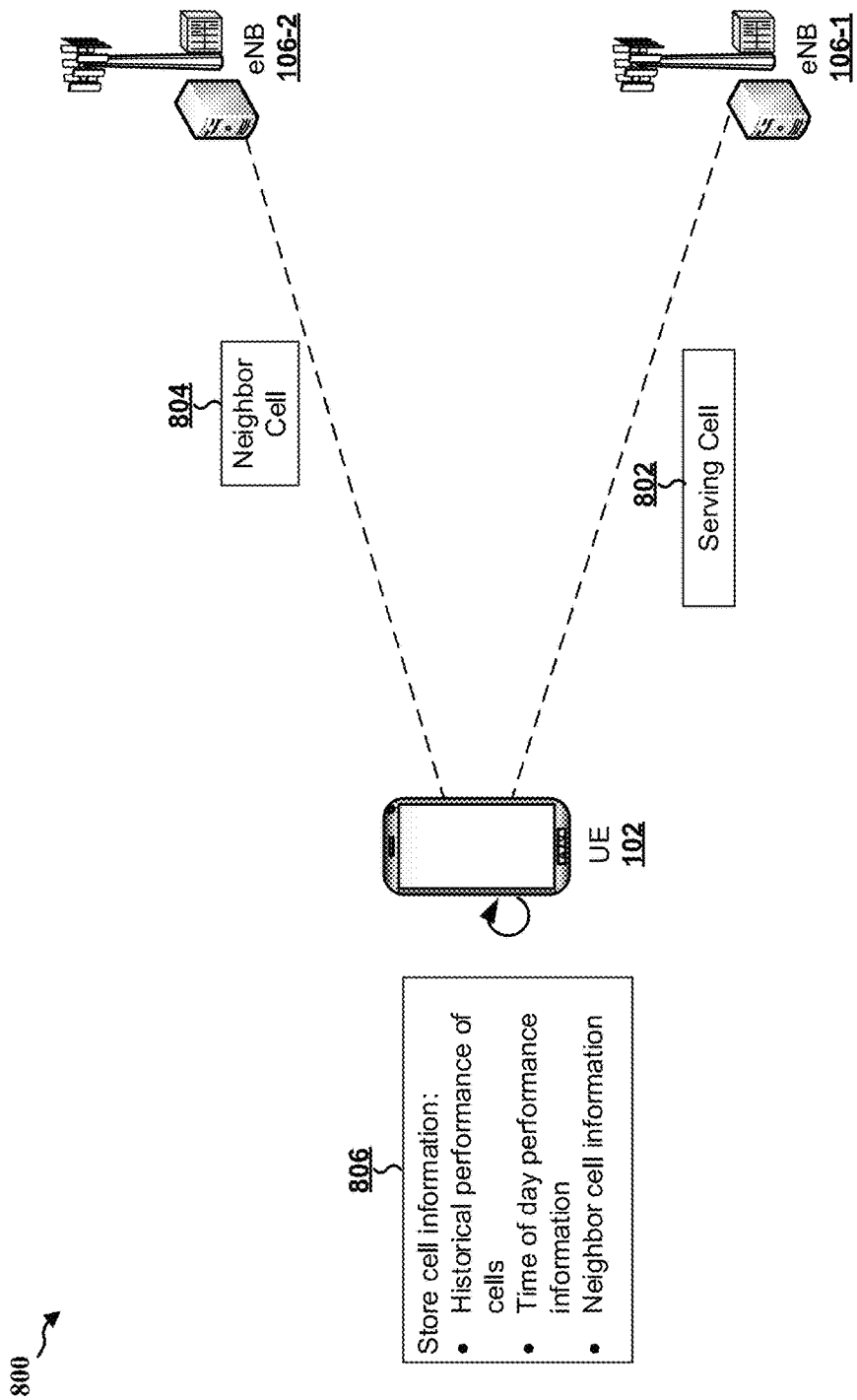
FIGS. 8A and 8B are diagrams illustrating another example system configured to selectively activate or deactivate an advanced receiver based at least in part on cell information, channel allocation information, and/or a device display status.
Figure 8B:
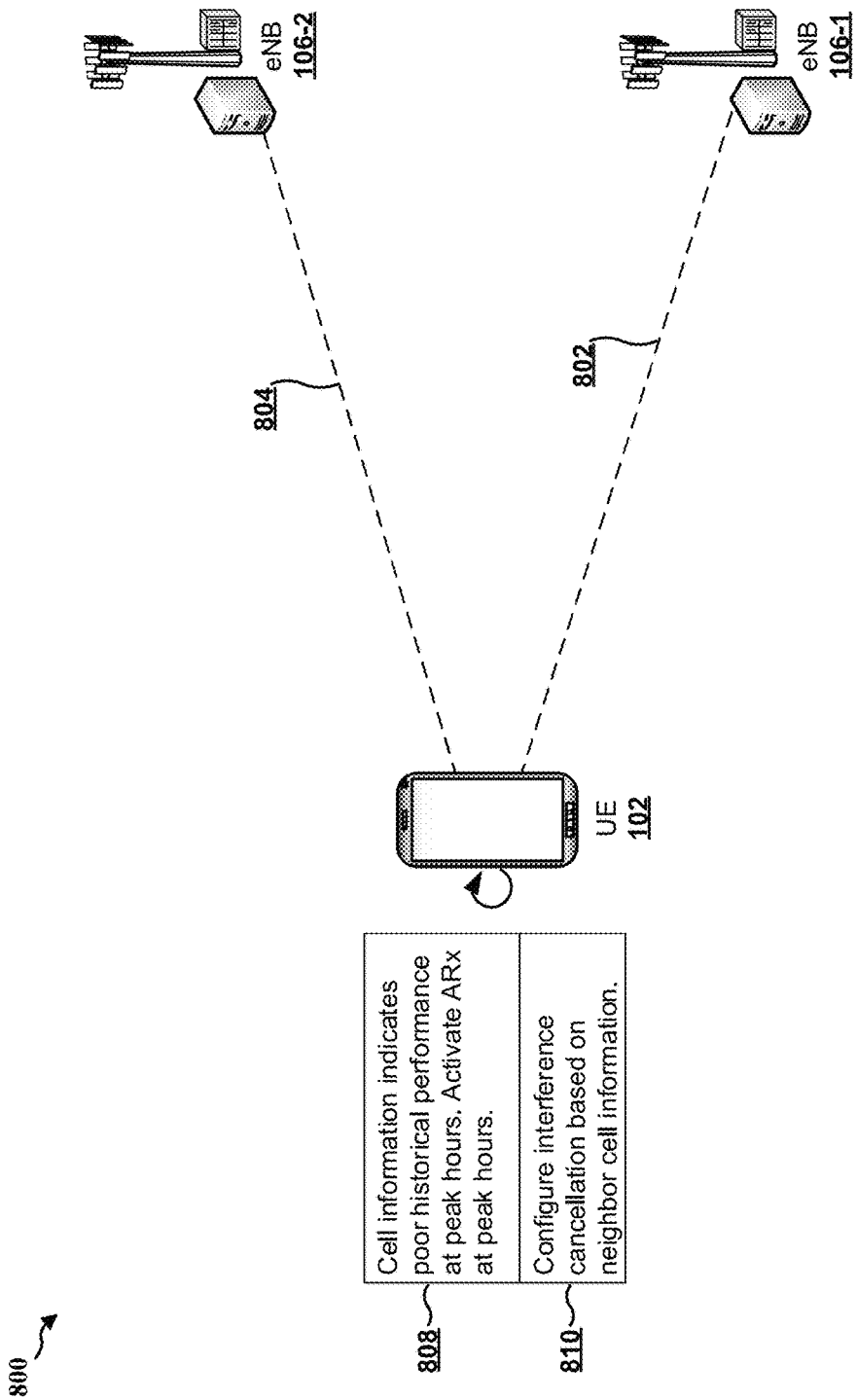

FIGS. 8A and 8B are diagrams illustrating another example system configured to selectively activate or deactivate an advanced receiver based at least in part on cell information, channel allocation information, and/or a device display status. As shown in FIGS. 8A and 8B, example system 800 may include a UE 102 (e.g., which may correspond to one or more of the UE 102 of FIG. 1, the UE 206 of FIG. 2, the UE 650 of FIG. 6, and/or the like), and an eNB 106 (e.g., which may correspond to one or more of the eNBs 106, 108 of FIG. 1, the eNBs 204, 208 of FIG. 2, the eNB 610 of FIG. 6, and/or the like).

As shown in FIG. 8A, and by reference number 802, the UE 102 may establish a connection with a serving cell 802 provided by eNB 106-1. In some aspects, the serving cell 802 may include a long dwell cell of the UE 102 (e.g., a cell that has maintained a connection with the UE 102 for a threshold length of time). As shown by reference number 802, the UE 102 may establish a connection with a neighbor cell 804 provided by eNB 106-2.

As shown by reference number 806, the UE 102 may receive cell information associated with the serving cell 802 and/or the neighbor cell 804. As shown, in some aspects, the cell information may include information identifying historical performance of the cells. The information identifying historical performance may identify, for example, throughput of a cell, a quantity of dropped calls experienced by UEs 102 connected to the cell, historical channel information associated with the cell, historical call quality information associated with the cell, and/or the like. As further shown, in some aspects, the cell information may include time of day performance information. The time of day performance information may correlate the information identifying historical performance with particular times of day.

As further shown, in some aspects, the cell information may include neighbor cell information. For example, when the serving cell 802 is a long dwell cell of the UE 102, the UE 102 may determine neighbor cell information associated with the neighbor cell 804. The neighbor cell information may include any information that is used to improve an interference cancellation process of the advanced receiver, such as information identifying channels provided by the neighbor cell 804, information identifying timing of synchronization signals transmitted by the neighbor cell 804, information identifying a location of the neighbor cell 804, information identifying a cell type of the neighbor cell, and/or the like.

In some aspects, the UE 102 may determine the cell information. For example, the UE 102 may determine the cell information by obtaining the cell information from the eNBs 106-1 and 106-2. Additionally, or alternatively, the UE 102 may determine the cell information by observing historical performance of the cells 802 and/or 804 (e.g., with regard to calls placed or received via the cells 802 and/or 804, data transmitted or received via the cells 802 and/or 804, signal strength or channel quality provided by the cells 802 and/or 804, etc.). In some aspects, the UE 102 may receive or access the cell information (e.g., from another UE 102, from a network entity, etc.). For example, a network entity may determine the cell information, and may store and/or provide the cell information to the UE 102.

As shown in FIG. 8B, and by reference number 808, the UE 102 may determine whether to activate or deactivate the advanced receiver based at least in part on the cell information. Here, the UE 102 determines that the cell information indicates poor historical performance of the cell (e.g., the serving cell 802 and/or the neighbor cell 804) at peak hours (e.g., hours of peak usage of the serving cell 802 and/or the neighbor cell 804). Accordingly, the UE 102 determines to activate the advanced receiver at the peak hours. In this way, the UE 102 improves reception in conditions identified by the historical cell information associated with the serving cell 802 and/or the neighbor cell 804, which improves performance of the UE 102.

As shown by reference number 810, in some aspects, the UE 102 may configure interference cancellation of the advanced receiver based at least in part on the neighbor cell information. For example, when the UE 102 establishes a connection with the serving cell 802, the UE 102 may configure the interference cancellation based at least in part on the neighbor cell information associated with the neighbor cell 804. In some aspects, the UE 102 may store the neighbor cell information at a first time corresponding to a first connection with the serving cell 802 and/or the neighbor cell 804, and may use the neighbor cell information at a second time corresponding to a second connection with the serving cell 802. By configuring the interference cancellation based at least in part on the neighbor cell information, the UE 102 improves performance of the interference cancellation and thus improves downlink performance.

While implementations described in connection with FIGS. 7A-7F and 8A-8B are described in the context of activating or deactivating an advanced receiver, any of the implementations of FIGS. 7A-7F and 8A-8B may additionally or alternatively be implemented by reconfiguring an advanced receiver. For example, the UE 102 may increase or decrease processor or battery resources allotted to the advanced receiver based at least in part on one or more of the above trigger conditions. Additionally, or alternatively, the UE 102 may increase a quantity of receiver antennas (e.g., from 2Rx to 4Rx, etc.). Additionally, or alternatively, the UE 102 may activate one or more aspects of the advanced receiver (e.g., interference cancellation, multi-antenna reception, etc.), and may deactivate one or more other aspects of the advanced receiver.

While some of the implementations described in connection with FIGS. 7A-7F and 8A-8B may describe the trigger conditions in isolation from each other (e.g., activating or deactivating the advanced receiver in response to a value of a single trigger condition), in some aspects, the UE 102 may determine whether to activate or deactivate the advanced receiver based at least in part on a combination of values of the above trigger conditions. For example, the UE 102 may assign weights to the above trigger conditions, and may combine weighted values of the trigger conditions to determine whether to activate or deactivate the advanced receiver.

In some aspects, the UE 102 may use other trigger conditions in addition to or independently of the trigger conditions above. The other trigger conditions may include, for example, a value of a HARQ packet error rate (e.g., the UE 102 may activate the advanced receiver when the HARQ packet error rate satisfies a threshold), a value of a real-time transport protocol (RTP) erasure rate or a TCP duplicate ACK number (e.g., the UE 102 may activate the advanced receiver when the RTP erasure rate or the TCP duplicate ACK number satisfies a threshold), a traffic type (e.g., may activate or deactivate the advanced receiver based at least in part on the traffic type), a battery status of the UE 102 (e.g., may deactivate the advanced receiver when the battery of the UE 102 is low), or the like.

In some aspects, the UE 102 may determine whether to activate or deactivate the advanced receiver based at least in part on information identifying past improvements in performance, processor usage, and/or battery usage associated with activating or deactivating the advanced receiver in response to one or more trigger conditions. For example, the UE 102 may identify a state of one or more trigger conditions, and may identify information identifying past improvements in performance associated with activating or deactivating the advanced receiver in response to the state of the one or more trigger conditions. The UE 102 may activate (or deactivate) the advanced receiver when the information identifying the past improvements satisfies a threshold, and may not activate (or deactivate) the advanced receiver when the information identifying the past improvements does not satisfy the threshold.

In some aspects, the UE 102 may receive or determine information indicating whether the advanced receiver should be activated or deactivated based at least in part on an algorithm, such as a machine learning algorithm, or the like. For example, the machine learning algorithm may be used to train a model based at least in part on the information identifying the past improvements in performance and trigger conditions associated with the past improvements in performance. The model may receive, as input, information identifying trigger conditions, and may output a predicted improvement in performance associated with the trigger conditions. The UE 102 may selectively activate or deactivate the advanced receiver based on the predicted improvement in performance.

In some aspects, the UE 102 may obtain information indicating a result of activating deactivating the advanced receiver (e.g., based at least in part on values of the trigger conditions described above). The UE 102 may use the information indicating the result to determine whether the activation or deactivation of the advanced receiver was optimal. The UE 102 may map information indicating whether the activation or deactivation was optimal with the collected metrics, and may use such information to bias the decision of whether to activate or deactivate the advanced receiver on future occasions (e.g., by comparing the collected metrics of the mapped information to newly determined values of one or more trigger conditions). In this way, the UE 102 may perform online learning based on feedback regarding the decision of whether to activate or deactivate the advanced receiver.

As indicated above, FIGS. 8A and 8B are provided as examples. Other examples are possible and may differ from what was described with regard to FIGS. 8A and 8B.

Figure 9:
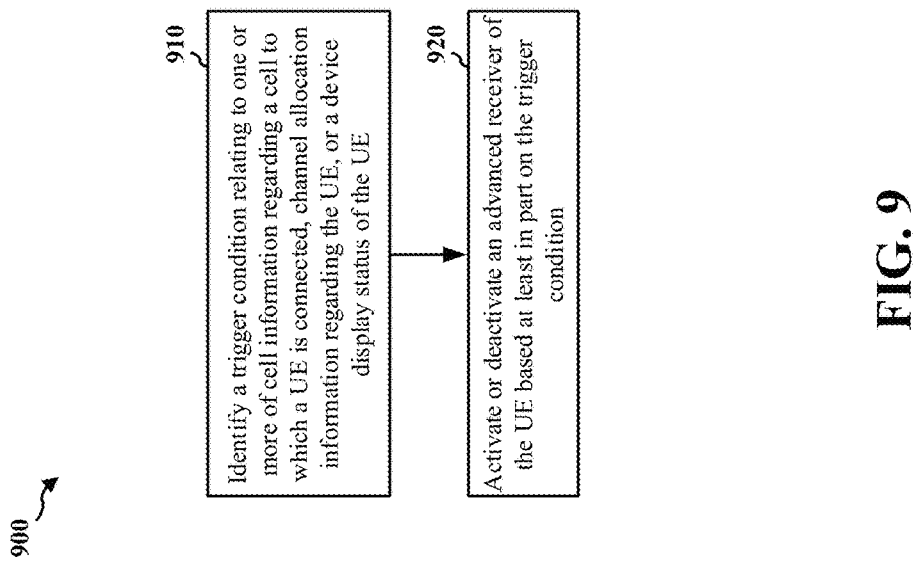
FIG. 9 is a flow chart of a method of wireless communication.

FIG. 9 is a flow chart 900 of a method of wireless communication. The method may be performed by a UE (e.g., which may correspond to one or more of the UE 102 of FIG. 1, the UE 206 of FIG. 2, the UE 650 of FIG. 6, the apparatus 1002/1002', and/or the like).

As shown in FIG. 9, in some aspects, process 900 may include identifying a trigger condition relating to one or more of cell information regarding a cell to which the UE is connected, channel allocation information regarding the UE, or a device display status of the UE (block 910). For example, the UE may identify a trigger condition based at least in part on information determined or received by the UE. In some aspects, the UE (e.g., the identifying component 1008, as described below) may identify a trigger condition based at least in part on a single one of the cell information, the channel allocation information, or the device display status. In some aspects, the UE (e.g., the identifying component 1008, as described below) may identify a trigger condition based at least in part on a combination of two or more of the cell information, the channel allocation information, and/or the device display status.

In some aspects, the UE may identify the trigger condition using information determined by the UE. For example, the UE may determine a device display status of the UE, and may identify the trigger condition according to the device display status. In some aspects, the UE may identify the trigger condition using information determined by another device, such as a base station or another UE. For example, the other device may determine predicted traffic information, a predicted improvement of activating or deactivating the advanced receiver, and/or the like, and may provide such information to the UE. The UE may selectively activate or deactivate the advanced receiver based at least in part on the information.

Additionally, or alternatively, the UE may determine that a cell is associated with a high speed condition (e.g., based at least in part on a speed of the UE and/or of one or more other UEs near the UE), and may identify the trigger condition according to the high speed condition. Additionally, or alternatively, the UE may identify a channel bandwidth allocation based at least in part on determining noise estimation information for a channel associated with the UE, and may identify the trigger condition according to the channel bandwidth allocation.

Additionally, or alternatively, the UE may determine historical cell information regarding historical performance of a cell (e.g., historical performance with regard to downlink traffic transmitted via the cell, time of day information associated with the cell, etc.), and may identify the trigger condition according to the historical cell information. Additionally, or alternatively, the UE may determine that a cell to which the UE is connected is a small cell, and may identify the trigger condition based at least in part on the cell being a small cell.

In some aspects, the UE may identify the trigger condition based at least in part on received information. For example, the UE may receive channel allocation information, such as a MCS index or scheduling information associated with downlink traffic of the UE, and may identify the trigger condition according to the MCS index. Additionally, or alternatively, the UE may receive historical cell information (e.g., from an eNB or base station, from a network device that stores historical cell information, from another UE, etc.), and may identify the trigger condition according to the historical cell information.

As shown in FIG. 9, in some aspects, process 900 may include selectively activating or deactivating an advanced receiver of the UE based at least in part on the trigger condition (block 920). For example, the UE may selectively activate or deactivate an advanced receiver of the UE based at least in part on the trigger condition. In some aspects, the UE may configure the advanced receiver based at least in part on the trigger condition. For example, the UE may receive or determine neighbor cell information associated with a neighbor cell of a serving cell (e.g., a long dwell cell of the UE), and may configure an interference cancellation operation based at least in part on the neighbor cell information. As another example, the UE may determine whether a cell is a small cell, and may configure an interference cancellation operation based at least in part on whether the cell is a small cell (e.g., may use a colliding mode for small cells, and may use a non-colliding mode for regular or large cells).

In some aspects, the UE may deactivate the advanced receiver when a cell is associated with a high speed condition, and may activate the advanced receiver when the cell is not associated with the high speed condition. Additionally, or alternatively, the UE may activate the advanced receiver when the cell is associated with historically poor performance (e.g., based at least in part on historical cell information and/or time of day information that satisfies one or more thresholds with regard to performance of the cell), and may deactivate the advanced receiver when the cell is not associated with historically poor performance.

Additionally, or alternatively, the UE may deactivate the advanced receiver when the UE is connected to or camped on a WiFi RAT, and may activate the advanced receiver when the UE is connected to or camped on an LTE RAT. Additionally, or alternatively, the UE may activate the advanced receiver when an estimated bandwidth allocation indicates that a channel associated with the UE is heavily scheduled, and may deactivate the advanced receiver when the estimated bandwidth allocation indicates that the channel is not heavily scheduled.

Additionally, or alternatively, the UE may deactivate the advanced receiver when an MCS allocation of the UE satisfies a threshold (e.g., when the MCS allocation is associated with a sufficiently complex modulation and coding scheme and/or a sufficiently high throughput), and may activate the advanced receiver when the MCS allocation does not satisfy the threshold. Additionally, or alternatively, the UE may determine a traffic arrival prediction. The UE may activate the advanced receiver at times when traffic is predicted to arrive (e.g., particular traffic, such as high priority traffic, high volumes of traffic, etc.), and may deactivate the advanced receiver at other times.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
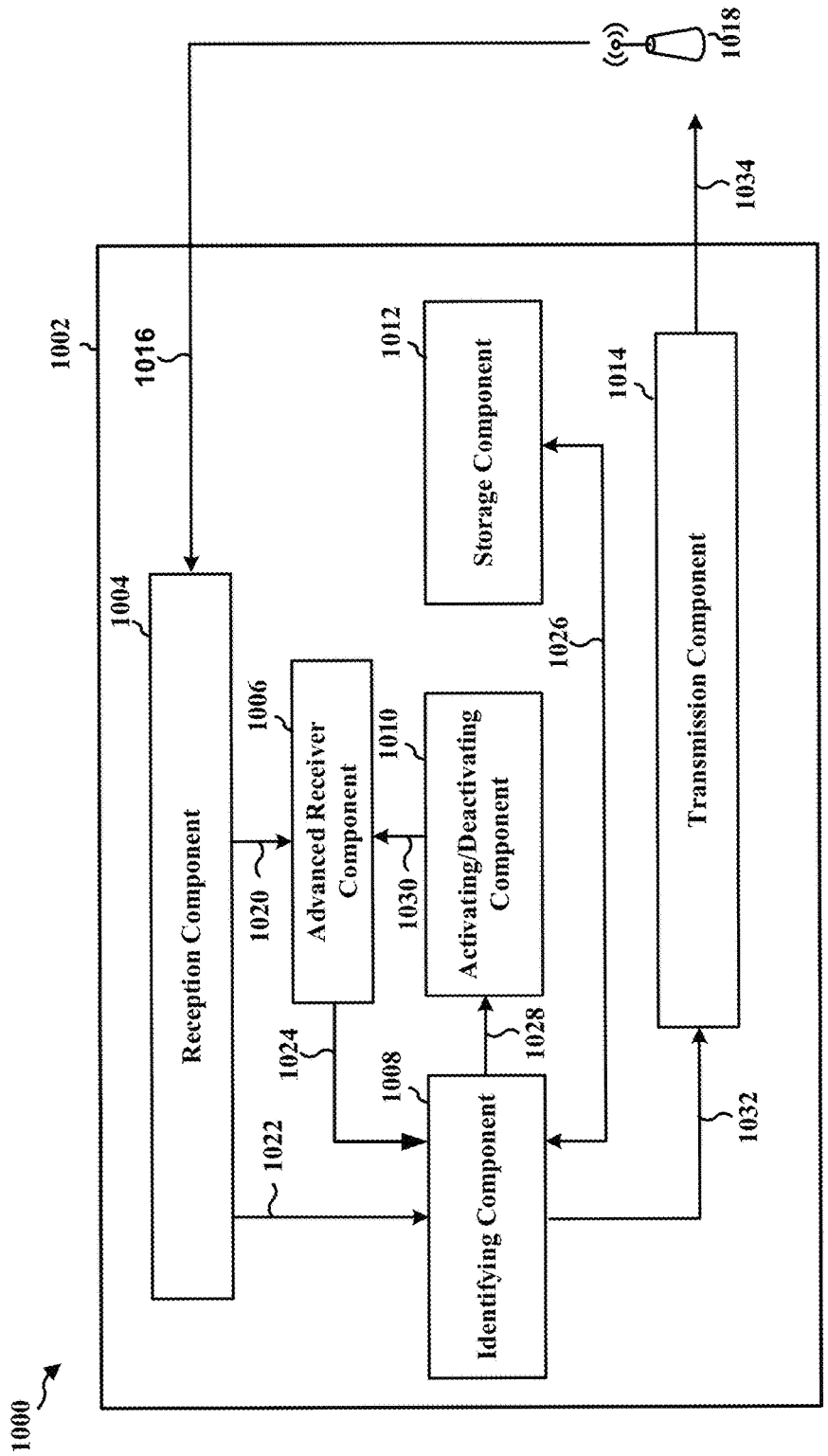
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a UE (e.g., which may correspond to one or more of the UE 102 of FIG. 1, the UE 206 of FIG. 2, the UE 650 of FIG. 6, or the like). The apparatus 1002 includes a receiving component 1004, an advanced receiver component 1006, an identifying component 1008, an activating/deactivating component 1010, a storage component 1012, and a transmission component 1014.

The reception component 1004 may receive data 1016, which may include information from an eNB 1018 (e.g., which may correspond to the eNBs 106, 108 of FIG. 1, the eNBs 204, 208 of FIG. 2, the eNB 610 of FIG. 6, or the like). For example, the reception component may receive information described in connection with FIGS. 7A-9, such as downlink traffic, channel allocation information, cell information, or the like. As shown, the reception component may provide data 1016 as output to the advanced receiver component 1006 (e.g., as data 1020). In some aspects, the reception component may provide the data 1016 as output to the identifying component 1008 (e.g., after processing the data and/or as data 1022, when the advanced receiver component 1006 does not process the data 1016).

The advanced receiver component 1006 may receive data 1020 from the reception component. The advanced receiver component 1006 may process data 1020 as described elsewhere herein. The advanced receiver component 1006 may provide processed data to one or more components of the apparatus 1002 (e.g., the identifying component 1008 as data 1024, a processor of the apparatus 1002, or another component).

The identifying component 1008 may receive data 1022/1024, and may identify a trigger condition based at least in part on the data 1022/1024. In some aspects, the identifying component 1008 may receive data 1026 (e.g., historical cell information, neighbor cell information, etc.) from the storage component 1012, and may identify the trigger condition based at least in part on the data 1026. The storage component 1012 may receive the data 1026 from the identifying component 1008 or another component, and may store the data 1026 for use by the identifying component 1008 to identify trigger conditions. The identifying component 1008 may output data 1028 to the activating/deactivating component 1010. The data 1028 may indicate whether to activate, deactivate, and/or configure the advanced receiver component 1006. The activating/deactivating component may provide data 1030 to the advanced receiver component 1006 to cause the advanced receiver component 1006 to be selectively activated or deactivated based at least in part on the data 1028. The advanced receiver component 1006 may be activated, deactivated, or configured according to the data 1030.

In some aspects, the identifying component 1008 may provide data 1032 to the transmission component 1014. The data 1032 may identify information to be provided to the eNB 1018 (e.g., information associated with a link adaptation value, etc.). The transmission component 1014 may transmit the data 1032 as data 1034 to the eNB 1018.

The apparatus 1002 may include additional components that perform each of the blocks of the algorithm in the aforementioned flow charts of FIG. 9. As such, each block in the aforementioned flow charts of FIG. 9 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
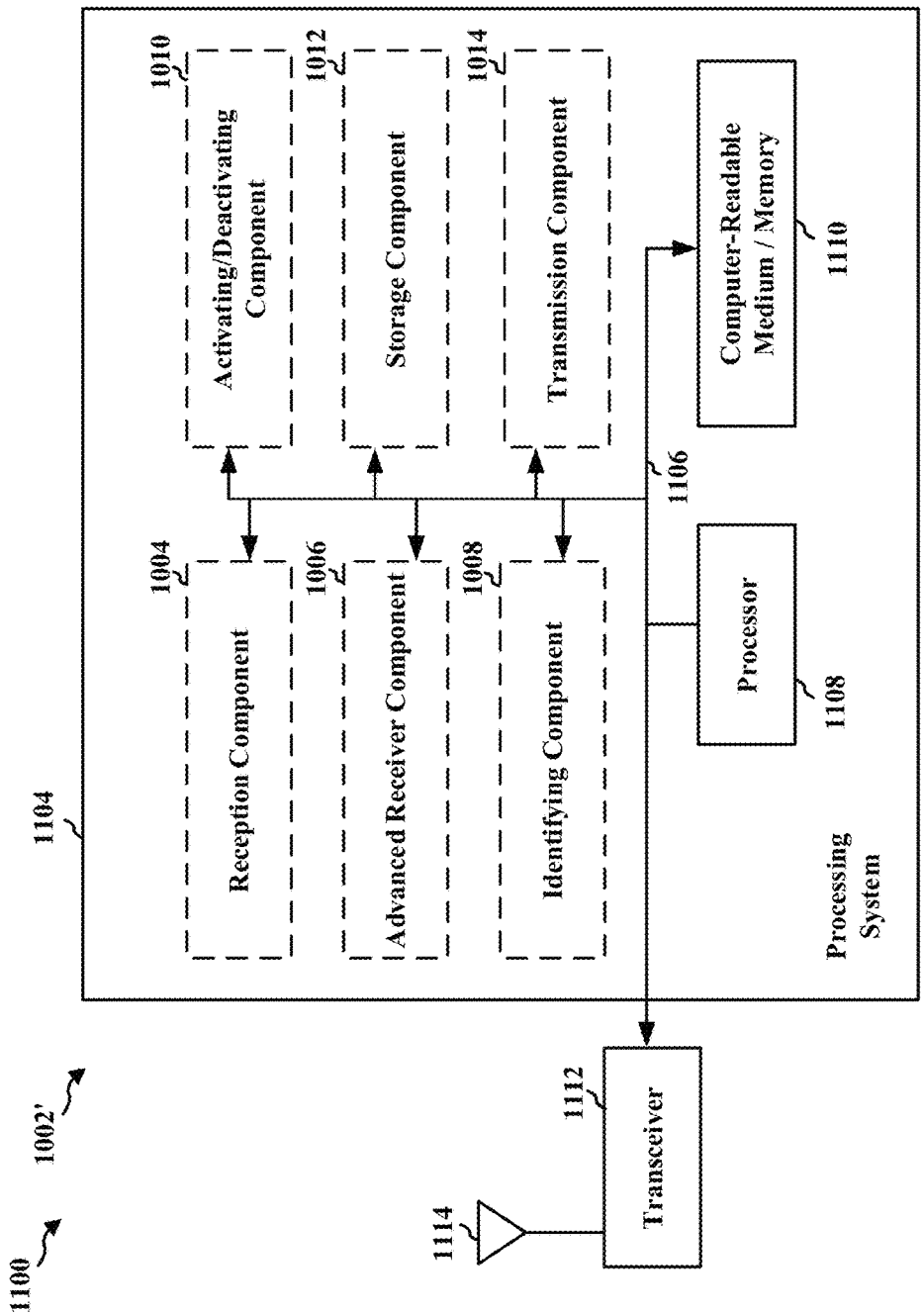
FIG. 11 is a diagram illustrating an example of a hardware implementation for an apparatus employing a processing system.

FIG. 11 is a diagram 1100 illustrating an example of a hardware implementation for an apparatus 1002' employing a processing system 1104. The apparatus 1002' may be a UE (e.g., which may correspond to one or more of the UE 102 of FIG. 1, the UE 206 of FIG. 2, the UE 650 of FIG. 6, or the like).

In some aspects, the processing system 1104 may be implemented with a bus architecture, represented generally by the bus 1106. The bus 1106 may include any number of interconnecting buses and bridges depending on the specific application of the processing system 1104 and the overall design constraints. The bus 1106 links together various circuits including one or more processors and/or hardware modules, represented by the processor 1108, the components 1004, 1006, 1008, 1010, 1012, and 1014, and the computer-readable medium/memory 1110. The bus 1106 may also link various other circuits such as timing sources, peripherals, voltage regulators, and power management circuits, which are well known in the art, and therefore, will not be described any further.

The processing system 1104 may be coupled to a transceiver 1112. The transceiver 1112 is coupled to one or more antennas 1114. The transceiver 1112 provides a means for communicating with various other apparatus over a transmission medium. The transceiver 1112 receives a signal from the one or more antennas 1114, extracts information from the received signal, and provides the extracted information to the processing system 1104, specifically the reception component 1004. In addition, the transceiver 1112 receives information from the processing system 1104, specifically the transmission component 1014, and based on the received information, generates a signal to be applied to the one or more antennas 1114. The processing system 1104 includes a processor 1108 coupled to a computer-readable medium/memory 1110. The processor 1108 is responsible for general processing, including the execution of software stored on the computer-readable medium/memory 1110. The software, when executed by the processor 1108, causes the processing system 1104 to perform the various functions described supra for any particular apparatus. The computer-readable medium/memory 1110 may also be used for storing data that is manipulated by the processor 1108 when executing software. The processing system further includes at least one of the components 1004, 1006, 1008, 1010, 1012, and/or 1014. The components may be software components running in the processor 1108, resident/stored in the computer readable medium/memory 1110, one or more hardware modules coupled to the processor 1108, or some combination thereof. The processing system 1104 may be a component of the UE 650 and may include the memory 660 and/or at least one of the TX processor 668, the RX processor 656, and the controller/processor 659.

In one configuration, the apparatus 1002/1002' for wireless communication includes means for identifying a trigger condition relating to one or more of cell information regarding a cell to which the apparatus is connected, channel allocation information regarding the apparatus, or a device display status of the apparatus; and means for selectively activating or deactivating, by the apparatus, an advanced receiver of the apparatus based at least in part on the trigger condition. The aforementioned means may be one or more of the aforementioned modules of the apparatus 1002 and/or the processing system 1104 of the apparatus 1002' configured to perform the functions recited by the aforementioned means. As described supra, the processing system 1104 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
   determining, by a user equipment (UE), a device display status of the UE;
   predicting, by the UE, downlink traffic based on the device display status of the UE;
   identifying, by the UE, a trigger condition relating to the downlink traffic; and
   selectively activating or deactivating, by the UE, an advanced receiver of the UE based at least in part on the trigger condition, wherein selectively activating or deactivating the advanced receiver comprises activating the advanced receiver in one or more periods when the UE is predicted to receive the downlink traffic.

2. The method of claim 1,
   wherein the trigger condition further relates to cell information regarding a cell to which the UE is connected;
   wherein the cell information identifies whether the cell is associated with a high speed condition; and
   wherein the advanced receiver is selectively activated or deactivated based at least in part on whether the cell is associated with the high speed condition.

3. The method of claim 1,
   wherein the trigger condition further relates to cell information regarding a cell to which the UE is connected;
   wherein the cell information identifies whether the cell is a small cell; and
   wherein the advanced receiver is selectively activated or deactivated based at least in part on whether the cell is a small cell.

4. The method of claim 1,
wherein the trigger condition further relates to cell information regarding a cell to which the UE is connected;
wherein the cell information identifies historical performance of the cell; and
wherein the advanced receiver is selectively activated or deactivated based at least in part on the historical performance of the cell.

5. The method of claim 4, wherein the cell information identifies the historical performance of the cell based at least in part on a time of day.

6. The method of claim 1,
wherein the advanced receiver is configured based at least in part on cell information identifying a neighbor cell of a cell to which the UE is connected.

7. The method of claim 1,
wherein the trigger condition further relates to cell information regarding a cell to which the UE is connected;
wherein the cell information identifies a radio access technology (RAT) to which the UE is connected; and
wherein the advanced receiver is selectively activated or deactivated based at least in part on the RAT to which the UE is connected.

8. The method of claim 1,
wherein the trigger condition further relates to channel allocation information regarding the UE;
wherein the channel allocation information identifies an estimated bandwidth allocation associated with a cell, to which the UE is connected, and determined based at least in part on a noise estimation; and
wherein the advanced receiver is selectively activated or deactivated based at least in part on the estimated bandwidth allocation.

9. The method of claim 1,
wherein the trigger condition further relates to channel allocation information regarding the UE;
wherein the channel allocation information identifies a modulation and coding scheme (MCS) allocation associated with the UE; and
wherein the advanced receiver is selectively activated or deactivated based at least in part on the MCS allocation.

10. The method of claim 1,
wherein the trigger condition further relates to channel allocation information regarding the UE;
wherein the channel allocation information identifies a traffic arrival prediction; and
wherein the advanced receiver is selectively activated or deactivated based at least in part on the traffic arrival prediction.

11. A device for wireless communication, comprising:
memory; and
one or more processors coupled to the memory, the memory and the one or more processors configured to:
determine a device display status of the device;
predict downlink traffic based on the device display status of the device;
identify a trigger condition relating to the downlink traffic; and
selectively activate or deactivate an advanced receiver of the device based at least in part on the trigger condition, wherein, when selectively activating or deactivating the advanced receiver, the one or more processors are configured to activate the advanced receiver in one or more periods when the device is predicted to receive the downlink traffic.

12. The device of claim 11,
wherein the trigger condition further relates to cell information regarding a cell to which the device is connected;
wherein the cell information identifies whether the cell is associated with a high speed condition; and
wherein the advanced receiver is selectively activated or deactivated based at least in part on whether the cell is associated with the high speed condition.

13. The device of claim 11,
wherein the trigger condition further relates to cell information regarding a cell to which the device is connected;
wherein the cell information identifies whether the cell is a small cell; and
wherein the advanced receiver is selectively activated or deactivated based at least in part on whether the cell is a small cell.

14. The device of claim 11,
wherein the trigger condition further relates to cell information regarding a cell to which the device is connected;
wherein the cell information identifies historical performance of the cell; and
wherein the advanced receiver is selectively activated or deactivated based at least in part on the historical performance of the cell.

15. The device of claim 11,
wherein the advanced receiver is configured based at least in part on cell information identifying a neighbor cell of a cell to which the device is connected.

16. The device of claim 11,
wherein the trigger condition further relates to cell information regarding a cell to which the device is connected;
wherein the cell information identifies a radio access technology (RAT) to which the device is connected; and
wherein the advanced receiver is selectively activated or deactivated based at least in part on the RAT to which the device is connected.

17. The device of claim 11,
wherein the trigger condition further relates to channel allocation information regarding the device;
wherein the channel allocation information identifies an estimated bandwidth allocation associated with a cell, to which the device is connected, and determined based at least in part on a noise estimation; and
wherein the advanced receiver is selectively activated or deactivated based at least in part on the estimated bandwidth allocation.

18. The device of claim 11,
wherein the trigger condition further relates to channel allocation information regarding the device;
wherein the channel allocation information identifies a modulation and coding scheme (MCS) allocation associated with the device; and
wherein the advanced receiver is selectively activated or deactivated based at least in part on the MCS allocation.

19. The device of claim 11,
wherein the trigger condition further relates to channel allocation information regarding the device;
wherein the channel allocation information identifies a traffic arrival prediction; and
wherein the advanced receiver is selectively activated or deactivated based at least in part on the traffic arrival prediction.

20. An apparatus for wireless communication, comprising:
- means for determining a device display status of the apparatus;
- means for predicting downlink traffic based on the device display status of the apparatus;
- means for identifying a trigger condition relating to the downlink traffic; and
- means for selectively activating or deactivating an advanced receiver of the apparatus based at least in part on the trigger condition, wherein the means for selectively activating or deactivating the advanced receiver comprise means for activating the advanced receiver in one or more periods when the apparatus is predicted to receive the downlink traffic.

21. The apparatus of claim 20,
- wherein the trigger condition further relates to cell information regarding a cell to which the apparatus is connected;
- wherein the cell information identifies whether the cell is associated with a high speed condition; and
- wherein the means for selectively activating or deactivating the advanced receiver is configured to selectively activate or deactivate the advanced receiver based at least in part on whether the cell is associated with the high speed condition.

22. The apparatus of claim 20,
- wherein the trigger condition further relates to cell information regarding a cell to which the apparatus is connected;
- wherein the cell information identifies whether the cell is a small cell; and
- wherein the means for selectively activating or deactivating the advanced receiver is configured to selectively activate or deactivate the advanced receiver based at least in part on whether the cell is a small cell.

23. The apparatus of claim 20,
- wherein the trigger condition further relates to cell information regarding a cell to which the apparatus is connected;
- wherein the cell information identifies historical performance of the cell; and
- wherein the means for selectively activating or deactivating the advanced receiver is configured to selectively activate or deactivate the advanced receiver based at least in part on the historical performance of the cell.

24. The apparatus of claim 20,
- wherein the trigger condition further relates to cell information regarding a cell to which the apparatus is connected;
- wherein the cell information identifies a radio access technology (RAT) to which the apparatus is connected; and
- wherein the means for selectively activating or deactivating the advanced receiver is configured to selectively activate or deactivate the advanced receiver based at least in part on the RAT to which the apparatus is connected.

25. The apparatus of claim 20,
- wherein the trigger condition further relates to channel allocation information regarding the apparatus;
- wherein the channel allocation information identifies an estimated bandwidth allocation associated with a cell, to which the apparatus is connected, and determined based at least in part on a noise estimation; and
- wherein the means for selectively activating or deactivating the advanced receiver is configured to selectively activate or deactivate the advanced receiver based at least in part on the estimated bandwidth allocation.

26. A non-transitory computer-readable medium storing instructions for wireless communication, the instructions comprising:
- one or more instructions that, when executed by one or more processors of a user equipment (UE), cause the one or more processors to:
  - determine a device display status of the UE;
  - predict downlink traffic based on the device display status of the UE;
  - identify a trigger condition relating to the downlink traffic; and
  - selectively activate or deactivate an advanced receiver of the UE based at least in part on the trigger condition, wherein the one or more instructions to selectively activate or deactivate the advanced receiver cause the one or more processors to activate the advanced receiver in one or more periods when the UE is predicted to receive the downlink traffic.

27. The non-transitory computer-readable medium of claim 26,
- wherein the trigger condition further relates to cell information regarding a cell to which the UE is connected;
- wherein the cell information identifies whether the cell is a small cell; and
- wherein the advanced receiver is selectively activated or deactivated based at least in part on whether the cell is a small cell.

28. The non-transitory computer-readable medium of claim 26,
- wherein the trigger condition further relates to cell information regarding a cell to which the UE is connected;
- wherein the cell information identifies historical performance of the cell; and
- wherein the advanced receiver is selectively activated or deactivated based at least in part on the historical performance of the cell.

29. The non-transitory computer-readable medium of claim 26,
- wherein the trigger condition further relates to cell information regarding a cell to which the UE is connected;
- wherein the cell information identifies a radio access technology (RAT) to which the UE is connected; and
- wherein the advanced receiver is selectively activated or deactivated based at least in part on the RAT to which the UE is connected.

30. The non-transitory computer-readable medium of claim 26,
- wherein the trigger condition further relates to channel allocation information regarding the UE;
- wherein the channel allocation information identifies a traffic arrival prediction; and
- wherein the advanced receiver is selectively activated or deactivated based at least in part on the traffic arrival prediction.

* * * * *